United States Patent [19]
Hashimoto et al.

[11] Patent Number: 5,909,647
[45] Date of Patent: Jun. 1, 1999

[54] PORTABLE TELEPHONE SYSTEM WITH TELEPHONE ANSWERING DEVICE

[76] Inventors: Kazuo Hashimoto, deceased, late of Tokyo; by Takako Hashimoto, legal representative, 28-2, Komazawa 2-chome, Setakaga-ku, Tokyo, both of Japan

[21] Appl. No.: 08/659,597

[22] Filed: Jun. 6, 1996

[30] Foreign Application Priority Data

Jun. 6, 1995 [JP] Japan .................................. 7-161551

[51] Int. Cl.$^6$ .................................................. H04M 1/65
[52] U.S. Cl. ...................... 455/412; 455/413; 455/414; 455/564
[58] Field of Search .................... 455/31.2, 412, 455/413, 414, 445, 459, 460, 564; 379/51, 142, 67, 214, 354

[56] References Cited

U.S. PATENT DOCUMENTS

| | | | |
|---|---|---|---|
| 4,821,308 | 4/1989 | Hashimoto . | |
| 4,942,598 | 7/1990 | Davis | 455/412 |
| 4,961,216 | 10/1990 | Baehr et al. | 455/412 |
| 5,117,449 | 5/1992 | Metroka et al. | 455/31.2 |
| 5,128,980 | 7/1992 | Choi | 455/412 |
| 5,313,515 | 5/1994 | Allen et al. | 455/413 |
| 5,402,466 | 3/1995 | Delahanty | 455/412 |
| 5,418,835 | 5/1995 | Frohman et al. | 455/413 |
| 5,457,732 | 10/1995 | Goldberg | 455/414 |
| 5,502,761 | 3/1996 | Duncan et al. | 379/142 |

FOREIGN PATENT DOCUMENTS

| | | | |
|---|---|---|---|
| 445 452 A1 | 3/1990 | European Pat. Off. | H04M 1/65 |
| 63-245047 | 10/1988 | Japan . | |
| 3-16062 | 3/1991 | Japan . | |
| 4-120922 | 4/1992 | Japan . | |
| 4-504787 | 8/1992 | Japan . | |
| 7-30639 | 1/1995 | Japan | H04B 7/26 |
| 2 279 209 | 12/1994 | United Kingdom | H04M 1/27 |
| 90/03068 | 3/1990 | WIPO | H04B 1/00 |

OTHER PUBLICATIONS

Excerpt from *Examination Guidelines for Patent and Utility Model in Japan*, Patent Law Section 29 (1) and 29(2), published by AIPPI–Japan.

*Primary Examiner*—Edwards F. Urban
*Assistant Examiner*—Thuan Nguyen
*Attorney, Agent, or Firm*—Melvin A. Hunn

[57] ABSTRACT

When a call is received at the TAD from telephone 1 via exchange A2 and exchange B3, the TAD transmits an outgoing message. In response to the aforementioned message, the caller transmits a message or telephone number data regarding his own telephone. After the TAD records the telephone number, it calls up portable telephone 6 by autodialing. When TAD and portable telephone 6 are in a connected condition via base station 5, and if TAD sends the telephone number data in a predetermined format, it will be displayed upon the display unit of portable telephone 6.

19 Claims, 8 Drawing Sheets

(Example of Service Request Signal and Portable Telephone Number)

PORTABLE TELEPHONE SYSTEM WITH TELEPHONE ANSWERING DEVICE

BACKGROUND OF THE INVENTION

The present invention concerns a portable telephone system with telephone answering device wherein after caller telephone number information which was sent from a caller's side to a telephone answering device which is provided on a subscriber's side and recorded thereby, the recorded caller telephone number information can be displayed on the portable telephone of the subscriber.

In the Japanese patent H3-16062 (U.S. Pat. No. 4,821, 308) by the same applicant, when the subscriber was away from home and when a caller's telephone number information had been recorded on the telephone answering device, a paging center (hereinafter "center") would be dialed up by an autodialer. When the center responded, the caller telephone number information was automatically transmitted to the center and subsequently the telephone number information was displayed on a pager.

On the other hand, among portable telephone systems, particularly digital type portable telephones, a service called caller's telephone number display service is becoming ready for deployment. In such service, a caller's telephone number data is displayed prior to the commencement of direct conversation commences between the caller and the portable telephone user. However, such service does not take advantage of the intermediation of a telephone answering device.

SUMMARY OF THE INVENTION

The present invention has telephone number data recording means used whenever a subscriber is away with his or her portable telephone, wherein if a call is received at the telephone answering device, the caller transmits his or her telephone number data in accordance with the outgoing message of the telephone answering device. Also, it has an autodialing means which works thereafter and sends a service request command and portable telephone number to an exchange, wherein such service causes telephone number data which had been transmitted from telephone answering device to be displayed. Furthermore, it has a transmission means which transmits one or more instances of telephone number data in a prescribed format when the portable telephone responds.

LEGEND 1 telephone set
2 exchange A
3 exchange B
4 telephone answering device (TAD)
5 base exchange
6 portable telephone (CH)
7 line monitoring unit
8 line transformer
9 control unit
10 console unit
11 tone generator
12 tone decoding unit
13 incoming message recording unit
14 outgoing message recording unit
15 autodial unit
16 memory
17 operation unit
18 relay
19 voice synthesis unit
20 antenna
21 transceiver
22 transceiver for control channels
23a~23n transceiver for speech channels
24 control unit
25 exchange for portable telephones
26 tone decoder
29 connection line
31 antenna
32 transmitter
33 receiver
34 control unit
35 ROM
36 memory (RAM)
37 operation unit
38 liquid crystal display
39 mouthpiece
40 earpiece
41 buzzer

DESCRIPTION OF THE PREFERRED EMBODIMENT

Figure 1:
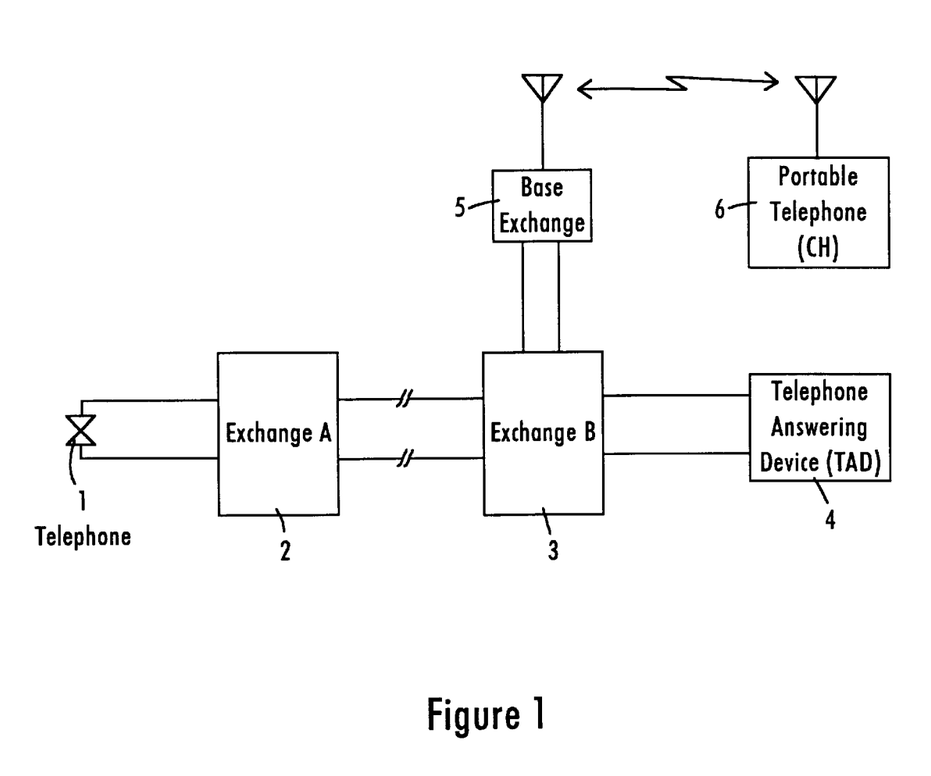
FIG. 1 is a block diagram of the overall system in the present invention.

FIG. 1 is a block diagram of the system in its entirety. Numeral 1 is a telephone on the side of a caller. Numeral 2 is telephone exchange A on the side of a caller. Numeral 3 is Exchange B on the side of a called party. Numeral 4 is a telephone answering device (TAD) which is installed in the subscriber's residence. Numeral 5 is a base exchange. Numeral 6 is a portable telephone (CH).

Figure 2:
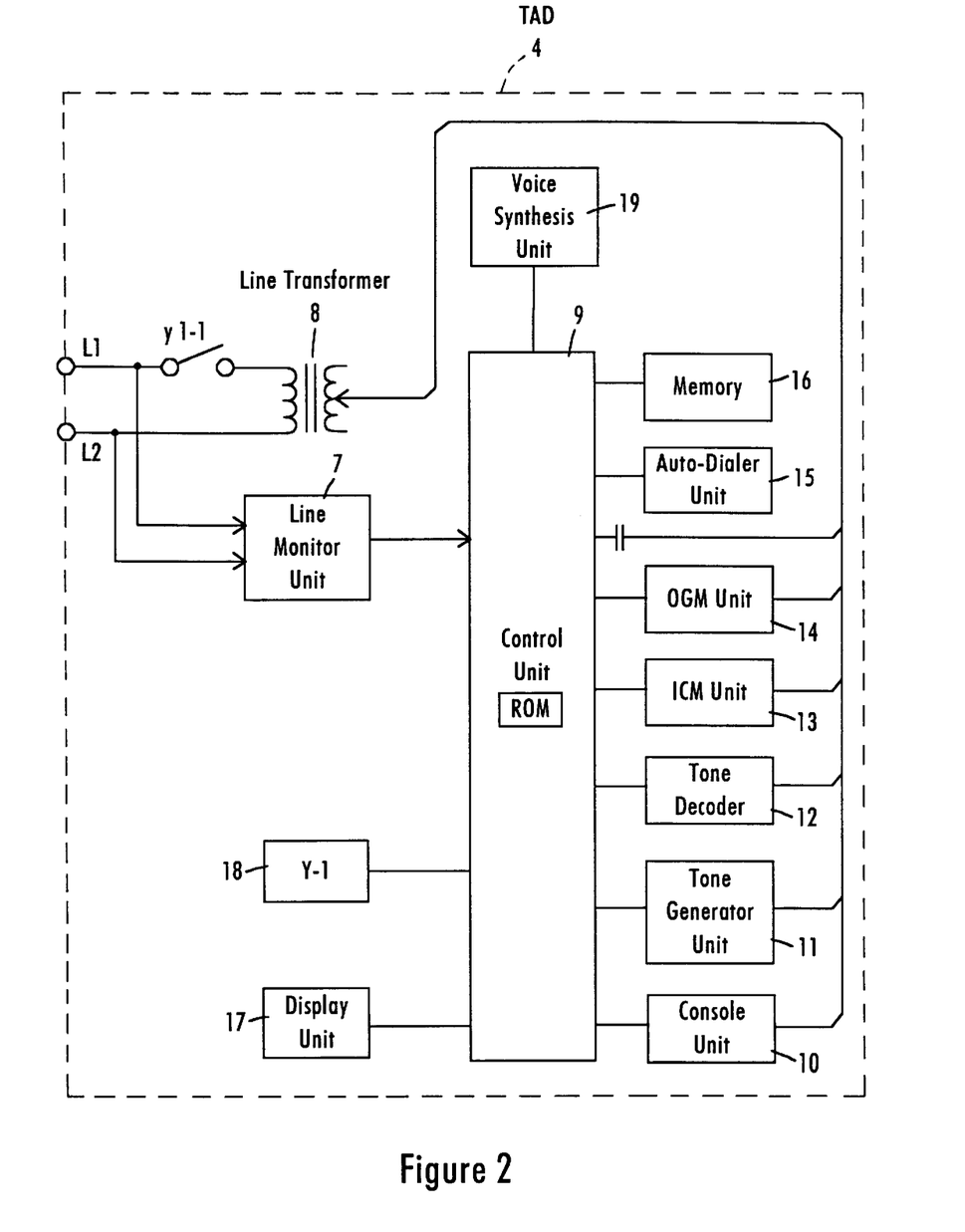
FIG. 2 is a block diagram of the TAD.

FIG. 2 is a block diagram which illustrates the organization of the aforementioned TAD. Numeral 7 is a line monitoring unit which detects ringing signals or changes in voltage on telephone line L1,L2. Numeral 8 is a line transformer which couples the telephone line to the TAD. Numeral 9 is a control unit which has a CPU. Numeral 10 is a console unit possessing various keys which are for example used for answering mode and registering telephone numbers which are used to call up the portable telephone.

Numeral 11 is a tone generator for generating DTMF tones used in the aforementioned registered telephone numbers.

Numeral 12 is a tone decoder unit. Telephone number information which arrives from the caller as DTMF tones is outputted as digital codes to the aforementioned control unit by tone decoder unit 12. Numeral 13 is an incoming message recording unit which records messages from callers.

Numeral 14 is an outgoing message unit which can record and play back multiple outgoing messages.

Numeral 15 is an autodialing unit which can store and call up a plurality of telephone numbers. Numeral 16 is a memory which can store a plurality of telephone number data records which are sent by callers. Numeral 17 is a liquid crystal display unit.

Numeral 18 is a relay which has a contact y1-1. Numeral 19 is a voice synthesis unit which is used for confirmation of the telephone number records which are sent by callers. The telephone number records are voice synthesized and played back.

Figure 3:
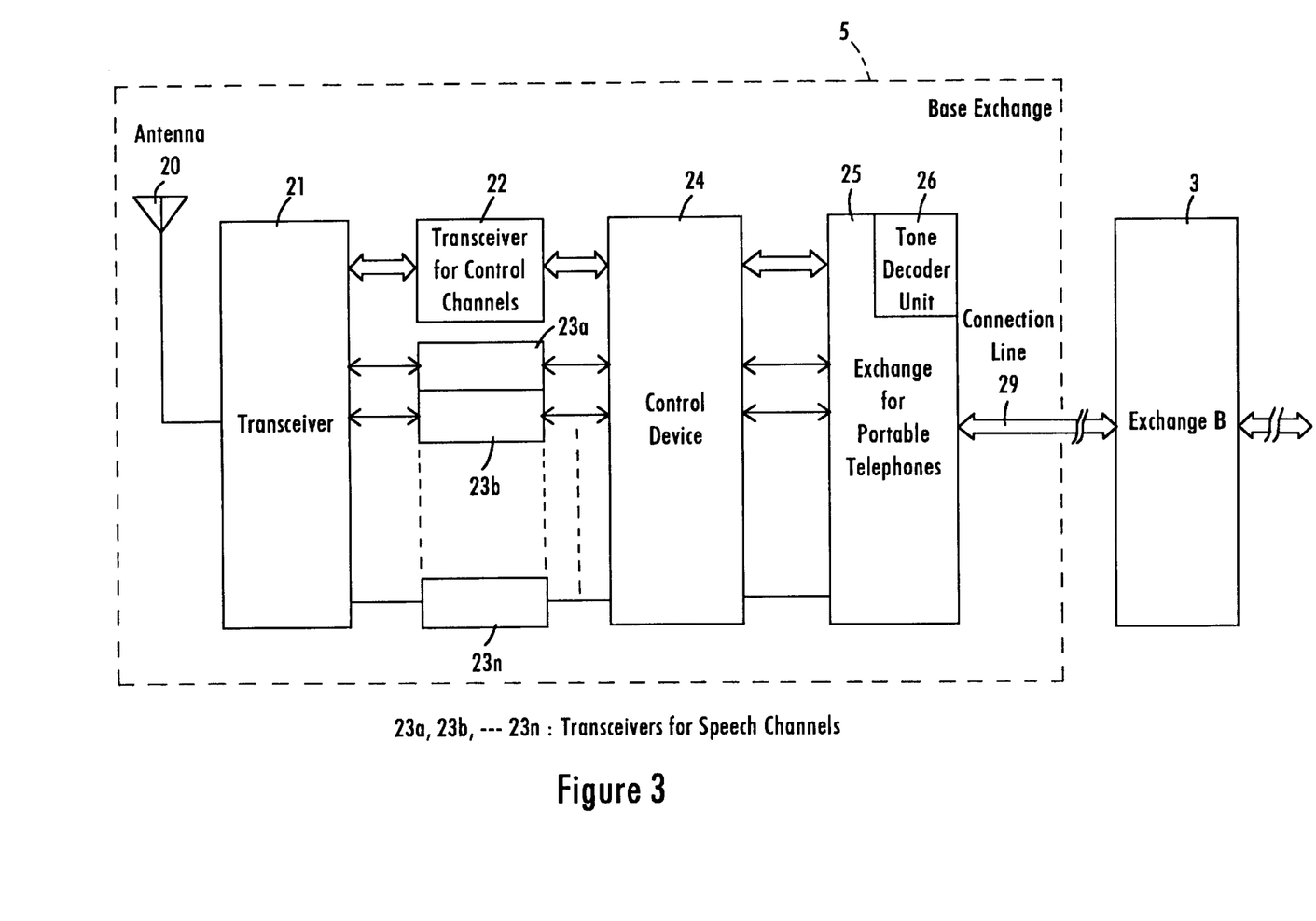
FIG. 3 is a block diagram of the base exchange.

FIG. 3 is a block diagram of base exchange 5. Numeral 20 is an antenna. Numeral 21 is a transceiver. Numeral 22 is a transceiver for control channels. Numerals 23a–23n are speech channels transceivers. Antenna 20 is connected to control channels transceiver 22 and speech channels transceivers 23a–23n via transceiver 21. These transceivers are connected to control device 24. They are further connected to telephone exchange B3 via portable telephone exchange 25 and connection line 29.

Numeral 26 is a tone decoder which is used to convert telephone number information from the aforementioned TAD into digital signals. It is also possible to have a tone decoder located in exchange A2 so that it is possible to transmit digital signals between exchange A3, exchange B3 and the base exchange.

Figure 4:
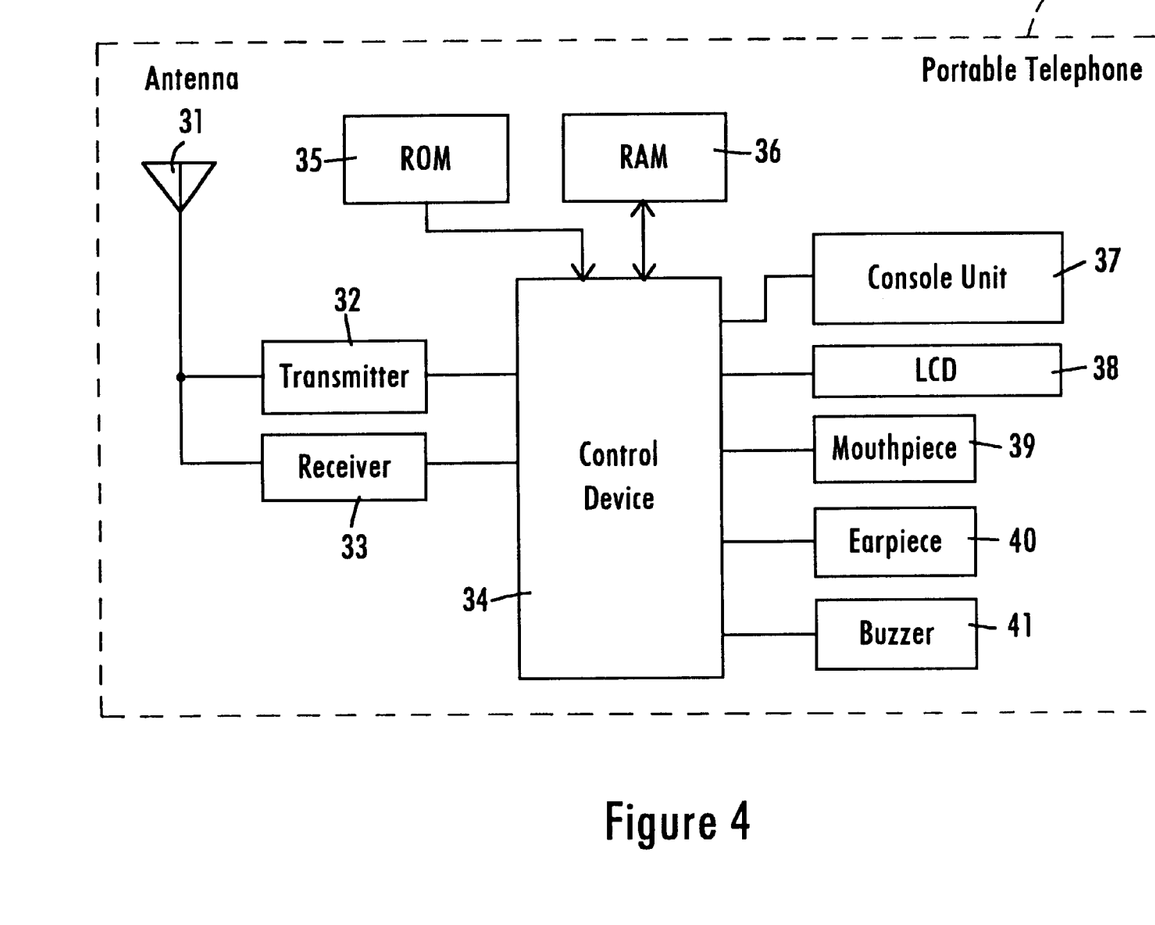
FIG. 4 is a block diagram of a portable telephone.

FIG. 4 is a block diagram illustrating portable unit 6. Numeral 31 is an antenna. Numeral 32 is a transmitter. Numeral 33 is a receiver. Numeral 34 is a control unit. The antenna is connected to the control unit via the transmitter and the receiver. Numeral 35 is a ROM, in which a control program is stored.

Numeral 36 is a RAM for storing telephone number data or the like which is sent from the TAD. Numeral 37 is an console unit which has various keys such as 0 through 9, * and #, which can be used when making a call. Numeral 38 is a liquid crystal display which can display telephone number data or the like when making or receiving calls. Numeral 39 is a mouthpiece (transmitter). Numeral 40 is an earpiece (receiver). Numeral 41 is a buzzer which generates a ringing tone when a ringing signal is received.

Portable telephone is on standby condition on the aforementioned control channels. When a call is received from the TAD, a ringing signal from control unit 24 is received at antenna 31 via the the portable exchange 25 in the aforementioned exchange B3. An answering signal is then generated by control unit 34 and transmitted as electromagnetic waves via transmitter 32 and antenna 31 to base exchange 5.

Explanation of operation wherein incoming messages or telephone number data is received on telephone answering device.

Figure 5:
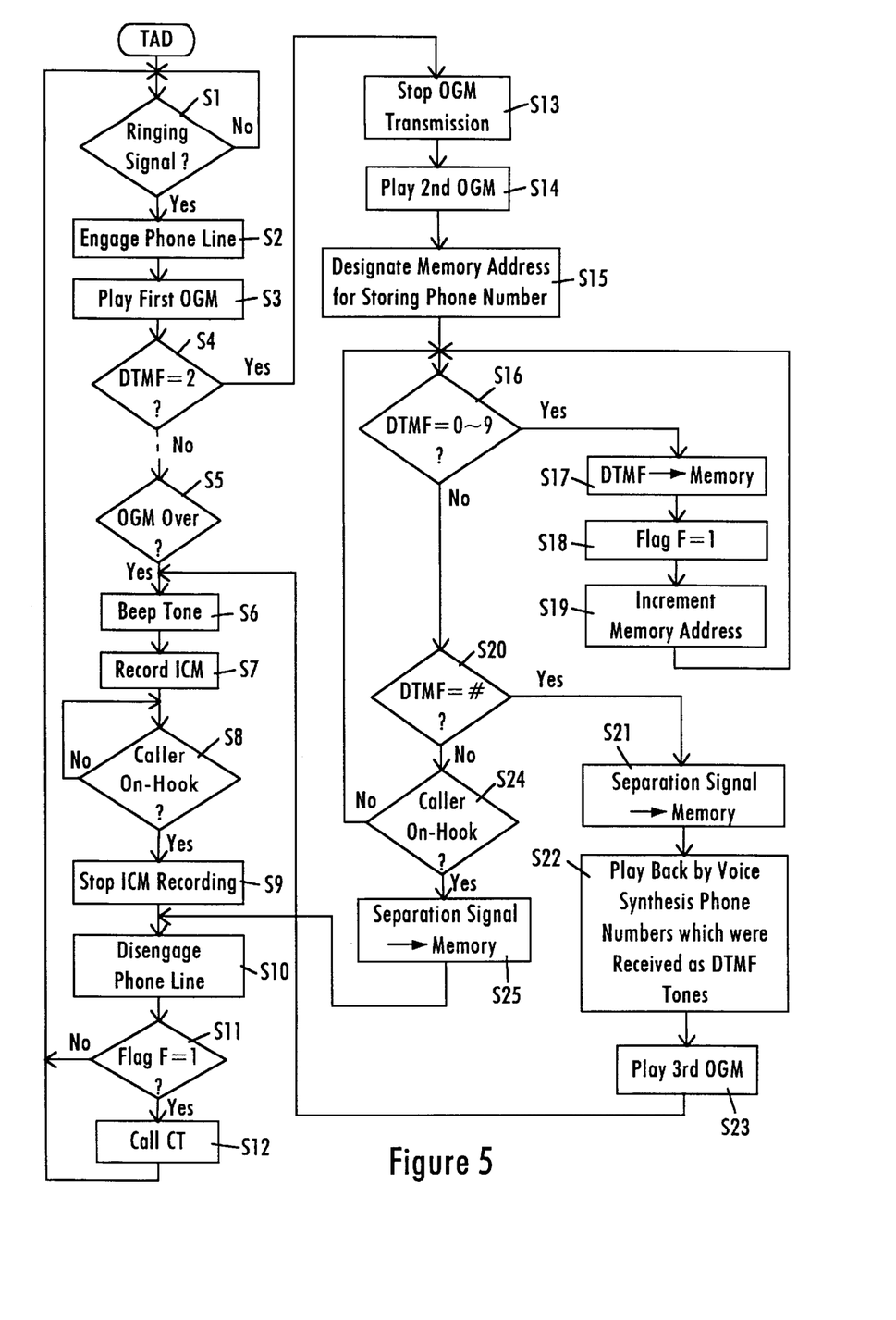
FIG. 5 is a flowchart illustrating operations related to recording by the TAD of telephone number data or messages from callers.

The following should be read with reference to FIG. 1, FIG. 2 and the flowchart shown in FIG. 5. The following operations will be explained covered: the reception of a call from a caller; the outgoing message (OGM) which is transmitted from TAD 4 in response thereto; the incoming message from the caller and the storing on the TAD of the telephone number data belonging to the caller's telephone.

When a call is received from a caller, a ringing signal is received via the telephone line L1,L2 and line monitoring unit 7 of FIG. 2, and it is applied to control unit 9 of FIG. 2. When the ringing signal is recognized as such, Step S1 of FIG. 5 becomes affirmative. A command from control unit 9 causes relay Y-1 to turn on and the ringing signal stops because the telephone line is engaged via contacts y1-1 and line transformer 8. Consequently, a speech mode is established between the caller's telephone 1 and the TAD at Step S2.

At this time, the first outgoing message (OGM) is selected from outgoing message recording unit 14 by means of a command from control unit 9. Transmission of this OGM through line transformer 8 is commenced at Step S3. An example of this OGM would be as follows: "Hello, this is the Hashimoto Corporation. We are unable to answer the phone right now. If you are in a hurry to speak to someone immediately, please press 2 on your pushbutton phone right now. If you are not in a hurry, please leave your message after the beep tone."

If the caller is not in a hurry, Step S4 becomes negative. Step S5 becomes affirmative when the end of the OGM is detected by control unit 9. A beep tone generated by the program is subsequently transmitted at Step S6.

Next, incoming message recording unit 13 commences operation and recording of the caller's message (ICM) is started. The caller records a message and places his or her telephone on hook when done. The voltage change at that time is detected by line monitoring circuit 7 and Step S8 becomes affirmative.

ICM recording operations are cancelled at Step S9 and the telephone line is disengaged (Step S10). Step S11 becomes negative and the program is restored to the standby condition of Step S1.

On the other hand, if the caller is in a hurry, he or she would press "2" in accordance with the instructions of the aforementioned first OGM. The DTMF tone "2" generated by telephone 1 is detected by tone decoding unit 12 via line transformer 8 and as a result Step S4 becomes affirmative. Transmission of the aforementioned first OGM is cancelled at Step S13. A second OGM is transmitted at Step S14. For example, "The person you want to speak to will call you back, so please enter your telephone number followed by the pound sign ("#") using the keys of your pushbutton phone."

At Step S15, an address for storing the caller's telephone number is designated at memory 16.

At this time, a DTMF tone representing a single digit of the telephone number data sent by the caller will be detected via tone decoding unit 12, which will cause Step S16 to become affirmative. The single digit of telephone number data will be stored in the designated memory at Step S17. For the purpose of operations which will be explained later, when a telephone number is inputted, flag F is set to "1" at Step S18. Next, at Step S19, the memory address for storing the next digit of telephone number data is incremented. The program returns to Step S16 where the next digit can be inputted.

Figure 7:
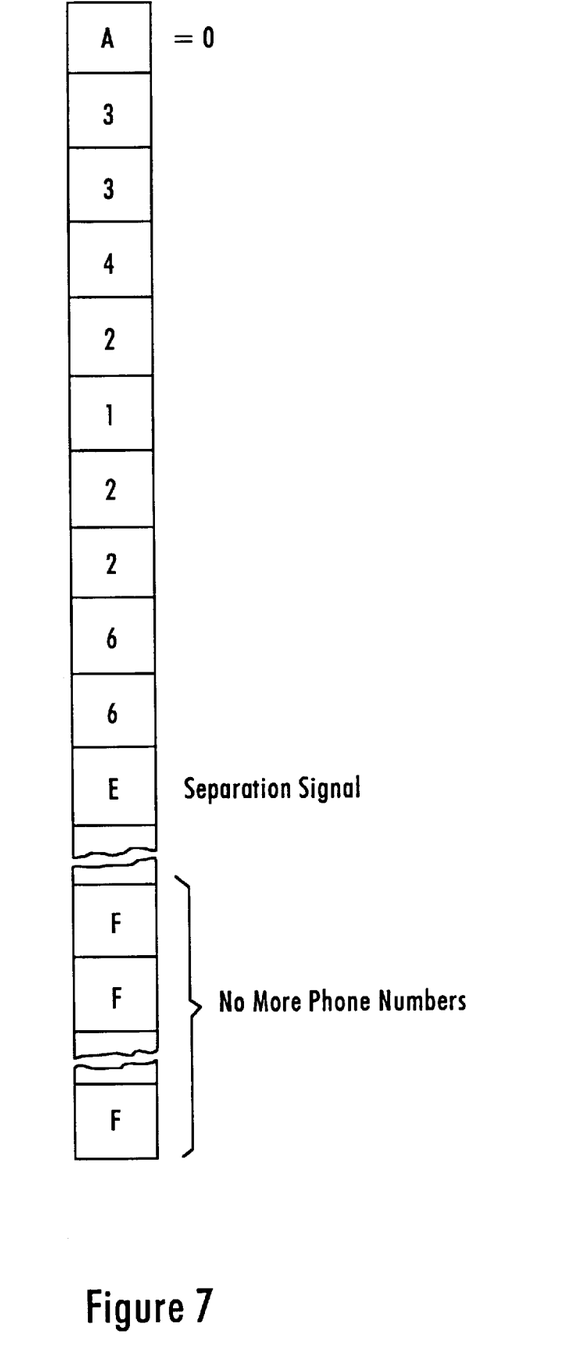
FIG. 7 is a diagram of an example of the arrangement of telephone number data in memory.

The above operations are repeated as needed. After the caller has inputted all of the digits and entered a pound sign, Step S20 will become affirmative. As a signal to separate telephone number data, the hexadecimal "E" shown in FIG. 7 will be stored in memory at Step S21. At Step S22, the telephone number data received in the aforementioned manner will be repeated back to the caller for confirmation purposes by voice synthesis using voice synthesizer unit 19.

If the caller made a mistake entering the aforementioned telephone number data, pressing the asterisk key ("*") will erase the telephone number data which was just stored in memory and will be possible to resend and store the correct telephone number data. However, the steps illustrating this procedure have been omitted from this flowchart.

After Step S22, a third OGM will be transmitted to the caller. For example, "You may leave a message after the beep." Then the caller's message may be recorded as shown earlier in the steps beginning with Step S6. If the caller does not need to leave a message, he or she may hang telephone 1 up.

In case the caller sent telephone number data, but placed telephone 1 on hook before entering a pound sign, the program, as a backup measure, will test for an on hook condition at Step S24 even though Step S20 had been negative. If Step S24 is affirmative, just as in the case of Step S21, a separation signal to separate telephone number data is stored in memory at Step S25.

Since, as shown above, telephone number data had been stored in memory 16 by the caller, Step S11 will become affirmative because flag "F" will be "1." Next, the subroutine "CALL CT," which will be described later, will be invoked.

Description of Operations in which Telephone Number Data is Transmitted to Portable Telephone Next, with reference to FIGS. 2 through 4 and FIG. 6, operations will be described in which telephone number data which is stored in the TAD are displayed on portable unit 6 via base exchange 5.

Figure 6:
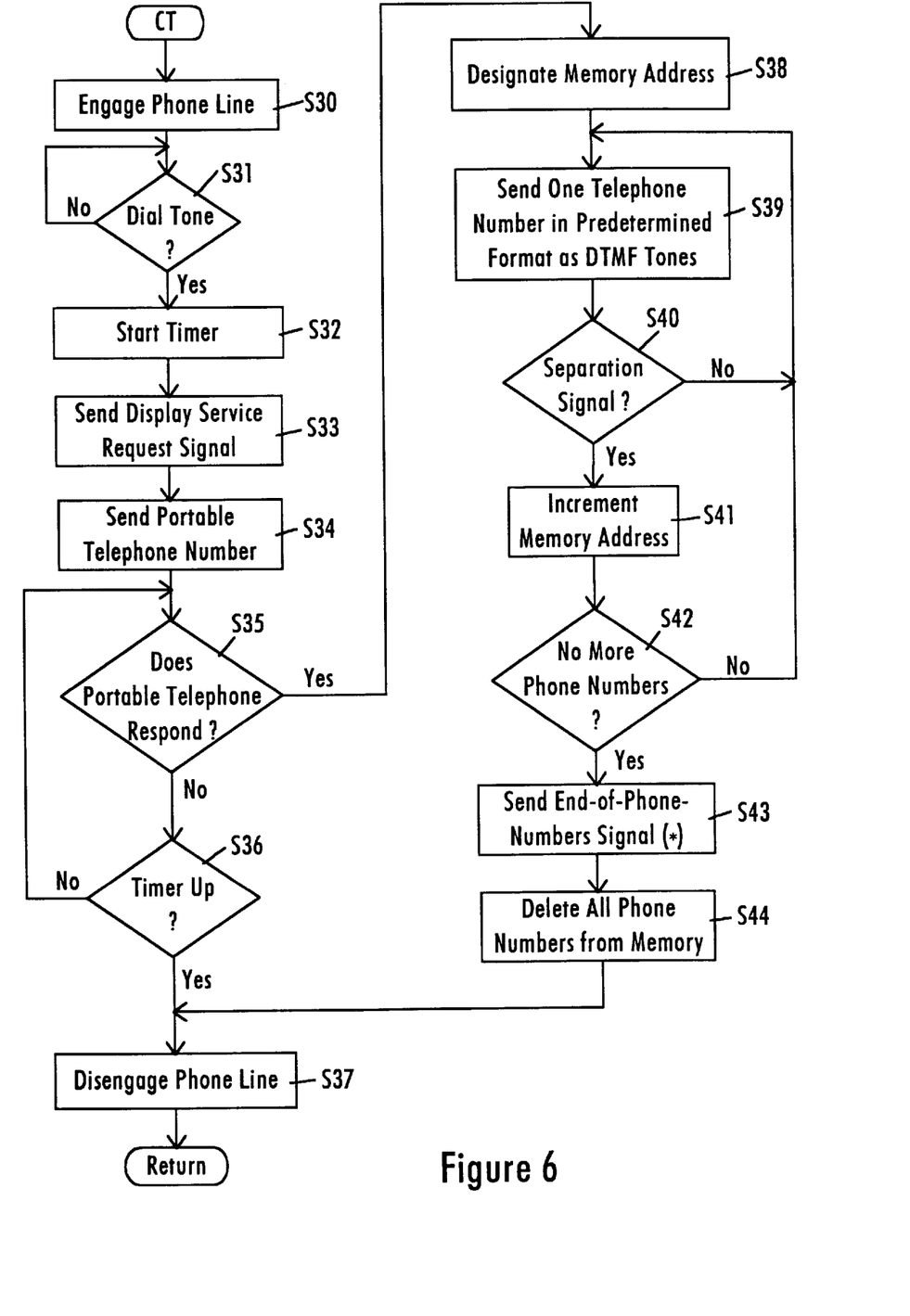
FIG. 6 is a flowchart illustrating operations related to transmission of telephone number data which was recorded on the TAD.

FIG. 6 shows subroutine "CT." When this subroutine is called, relay Y-1 is turned on by a command from control unit 9 and the telephone line is engaged by contacts y-1-1. At this point, a dial tone which is sent from exchange B3 is detected via an amplifier (not shown in the diagrams) which is in the incoming message recording unit, and consequently Step S31 becomes affirmative.

Figure 8:
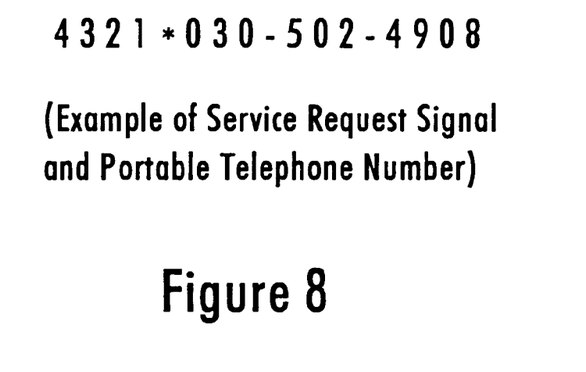
FIG. 8 is a diagram illustrating an example of a service request signal and a portable telephone number.

In the event portable telephone 6 does not respond within a prescribed time, as it should, a timer of one to two minutes is started at the next step, S32. A display service request signal which is stored in the autodial unit, as shown for example in FIG. 8 as "4321*" is sent at Step S33. The display service request signal is sent to base exchange 5 so that telephone number data which is sent by the calling party side, in this case the telephone answering device, will be displayed on the portable telephone being called up. Next, a Step S34, the telephone number of the portable telephone, for example "030-50-24908"

The following operation is not shown on the flowchart but because exchange B3 can recognize portable telephone numbers belonging to portable telephones, it will forward the call to base exchange 5.

Tone decoder 26 which is built into base exchange 5 detects the aforementioned "4321*" and determines that it is a display service request signal. Base exchange 5, at the same time as it waits for the arrival of telephone number data from the calling party, in other words, the telephone answering device, recognizes the number which arrives after the service request signal as a portable telephone number. Thereafter, base exchange calls up portable telephone 6 via control unit 24, an open channel of transceiver 22, transceiver 21 and antenna 21.

At this point, electromagnetic waves reach the portable telephone and when the response signal of the portable telephone comes back through the aforementioned control channel, a connection is established between base exchange 5 and the TAD via exchange B3. The ringer of the portable telephone is constructed so as not to ring until the telephone number data is received.

Step S35 of FIG. 6 is affirmative and an address of memory 16 is designated at Step 38. Data corresponding to one instance of telephone number data is transmitted at Step 39 until the aforementioned separation signal is detected.

Figure 9:
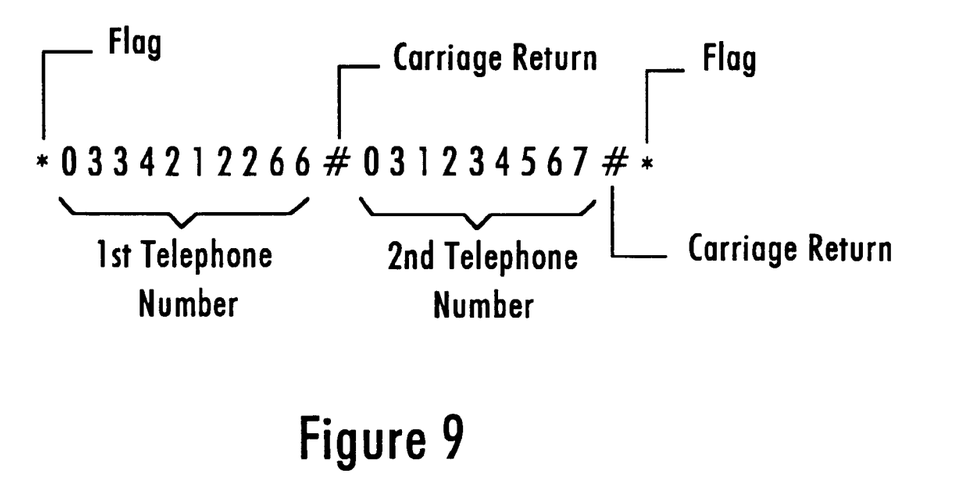
FIG. 9 is a diagram illustrating the format of telephone number data which is transmitted from the telephone answering device.

The DTMF tones are sent in the sequential format shown in FIG. 9, for example. When the first flag "*," which is shown in FIG. 9, is detected at base exchange 5, the telephone number data which is sent after it (in FIG. 9, two instances of telephone number data are shown) is converted to digital signals and transmitted to portable telephone 6 via the aforementioned control channel. A pound sign "#" is used to indicate a carriage return.

When base exchange 5 detects the last flag "*" (Step 43), it determines the reception of telephone number data to be concluded. It then sends a signal to portable telephone 6 to cause a ringing tone different from that of a normal ringing tone to be rung, which indicates that telephone number data has been displayed.

At the TAD side, when transmission of all the telephone number data has been concluded, all telephone numbers stored in the aforementioned will be erased (covered up by hexadecimal "F"s) at Step S44. The telephone line is then disengaged at Step S37 and the subroutine is concluded.

In case portable telephone 6 is in an area unreachable by electromagnetic waves, TAD will autodial five times at two minute intervals. Thereafter, it will autodial at 10 minute intervals. As this function is well known art, a flowchart for it has been omitted.

It is often the case that when a user goes outside with his portable telephone, he or she would set his or her telephone answering device to answer mode and to have at such times, as part of the outgoing message, the phrase ". . . those with urgent business may reach me at my portable phone whose number is . . . " Such a method had the disadvantage of requiring a caller to bear the cost of dialing a portable phone at expensive rates.

In the present invention, non-urgent callers can leave messages on the telephone answering device. Callers with urgent business only have to record telephone data on a telephone answering device in order to contact its owner and the callers do not have to bear the, burden of cost. Furthermore, the present invention repeatedly autodials the user until contact is made.

What is claimed is:

1. A portable telephone system with telephone answering device, said device comprising the following:

means for engaging a telephone line when a ringing signal is received at a telephone answering device from a calling party;

means for sending an outgoing message to said calling party;

means for setting said telephone answering device in a telephone number receiving mode, in which a telephone number sent by said calling party is received without recording a voice message from said caller, in response to a predetermined urgency signal from said calling party; and for setting said telephone answering device in a message recording mode, in which a voice message from said calling party is recorded, if said predetermined urgency signal from said calling party is not detected;

means for disengaging and restoring said telephone line after said recording;

autodialing means which subsequently sends to an exchange a telephone number of a portable telephone belonging to owner of said telephone answering device;

means for sending in a predetermined format said recorded telephone number data when said portable telephone responds.

2. A telephone system comprising:

a switching system for providing a caller with access to a telephone terminal of a subscriber, a telephone answering device provided at the telephone terminal and having a controller for setting said answering device in a telephone number receiving mode to store a telephone number of the caller without recording a voice message from the caller in response to a predetermined signal from the caller indicating an urgent condition, and for setting said answering device in a message recording mode to record a voice message from the caller when no predetermined signal indicating an urgent condition is detected, and a portable telephone device carried by the subscriber at a location remote with respect to said telephone terminal, and responsive to said switching system for receiving the telephone number of the caller when said telephone answering device is set in the telephone number receiving mode.

3. The system of claim 2, wherein said portable telephone device has a display for displaying the telephone number of the caller.

4. The system of claim 3, wherein said telephone answering device comprises an auto dialing unit for sending a display service request signal to set said portable telephone device in a display mode to display the telephone number of the caller.

5. The system of claim 2, wherein said telephone answering device comprises an outgoing message unit for supplying the caller with a first outgoing message that requests him to supply the predetermined signal if his call is urgent.

6. The system of claim 5, wherein said outgoing message unit supplies the caller with a second outgoing message in response to the predetermined signal.

7. The system of claim 6, wherein said outgoing message unit supplies the caller with a third outgoing message after receiving the telephone number of the caller.

8. The system of claim 2, wherein said switching system comprises a telephone exchange for connecting the telephone answering device to telephone lines.

9. The system of claim 8, wherein said switching system further comprises a base exchange coupled to said telephone exchange for providing communications between said portable telephone device and said telephone answering device.

10. The system of claim 9, wherein said telephone answering device converts the received telephone number of the caller into DTMF tones supplied to the telephone exchange.

11. The system of claim 10, wherein said base exchange converts the DTMF tones received from said telephone answering device into digital signals representing the telephone number of the caller.

12. The system of claim 11, wherein said base exchange communicates with said portable telephone device using electromagnetic waves.

13. The system of claim 2, wherein a plurality of telephone numbers are transmitted from said telephone answering device to said portable telephone device.

14. The system of claim 13, wherein the telephone numbers are separated by separation signals.

15. In a telephone system wherein a subscriber has a telephone answering device and a portable telephone device, a method of receiving information from a caller comprising the steps of:

connecting the caller to the telephone answering device, setting the telephone answering device in a telephone number receiving mode to store a telephone number of the caller without recording a voice message from the caller in response to a predetermined signal from the caller indicating an urgent condition, setting the telephone answering device in a message recording mode to record a voice message from the caller when no predetermined signal indicating an urgent condition is detected, and sending the telephone number of the caller to the portable telephone device when the telephone answering device is set in the number receiving mode.

16. The method of claim 15, further comprising the step of sending a display service request signal to the portable telephone device to display the telephone number of the caller on a display of the portable telephone device.

17. The method of claim 15, further comprising the step of supplying the caller with a first outgoing message that requests him to supply the predetermined signal if his call is urgent.

18. The method of claim 17, further comprising the step of supplying the caller with a second outgoing message in response to the predetermined signal indicating an urgent condition.

19. The method of claim 18, further comprising the step of supplying the caller with a third outgoing message after receiving the telephone number of the caller in the number receiving mode.

* * * * *